Jan. 27, 1931.  A. O. WILLIAMS  1,790,516
UNIVERSAL JOINT
Filed Nov. 3, 1928   2 Sheets-Sheet 1

Inventor:
Alfred O. Williams.
By Brown, Jackson, Boettcher + Dienner
Attys.

Jan. 27, 1931.  A. O. WILLIAMS  1,790,516
UNIVERSAL JOINT
Filed Nov. 3, 1928   2 Sheets-Sheet 2
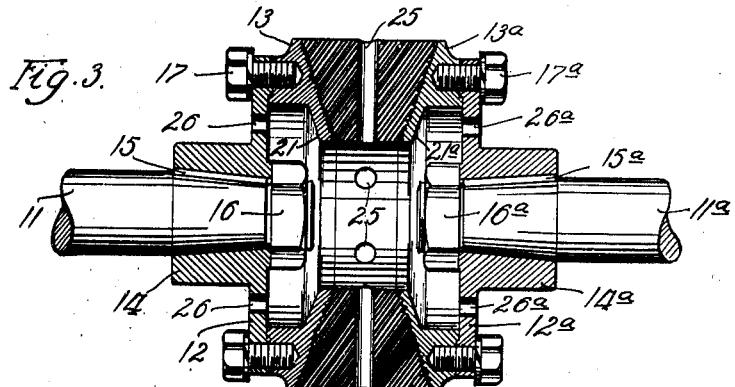
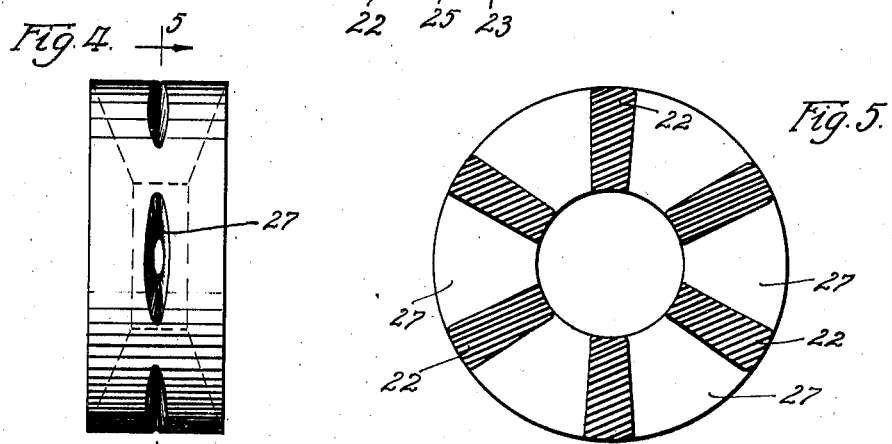
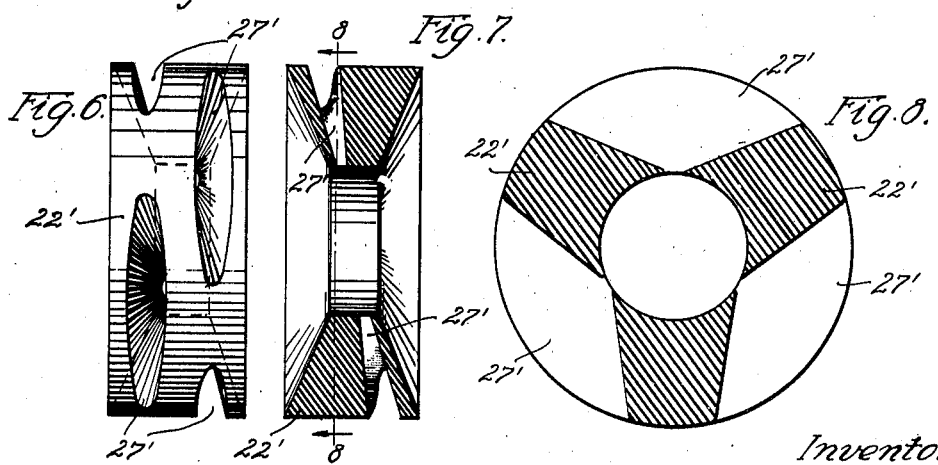
Inventor:
Alfred O. Williams.
By Brown, Jackson, Boettcher & Drenner
Attys.

Patented Jan. 27, 1931

1,790,516

UNITED STATES PATENT OFFICE

ALFRED O. WILLIAMS, OF BATTLE CREEK, MICHIGAN, ASSIGNOR TO CLARK TRUC-TRACTOR CO., OF BATTLE CREEK, MICHIGAN, A CORPORATION OF MICHIGAN

UNIVERSAL JOINT

Application filed November 3, 1928. Serial No. 316,914.

The present invention relates to universal joints, and aims generally to provide an improved construction in which all relative movement between the driving and driven elements of the joint occurs by virtue of the elastic flexing of an interposed rubber connecting member instead of by pivotal movement between pivotally connected parts. The present construction avoids the wear and consequent noise inherent in pivotally coupled parts having metal-to-metal contact; it cushions or absorbs motor impulses or such other torque shocks as either the driving or driven element may tend to transmit through the joint, such torque cushioning action not being present in the ordinary articulated joint; and it is much cheaper to construct and easier to assemble than the ordinary universal joint.

The interposed rubber connecting member is vulcanized to the driving and driven elements of the joint, and one of the more specific objects of the invention is concerned with the manner in which the area of vulcanizing attachment is greatly increased.

Another object of the invention is concerned with the sectional form of the rubber connecting member. whereby those portions of said member called upon to withstand the greatest amount of flexing in the relative movement of the joint are of greater sectional thickness for accommodating this larger relative movement without injury to the rubber.

Another object is to provide improved means for cooling the rubber connecting member and thereby effectively dissipating any heat which may be set up therein in the rapid flexing of the member.

Other objects and advantages of the invention will appear in the following description of a preferred embodiment thereof. In the accompanying drawings, illustrating such embodiment:

Figure 3 is a view similar to Figure 1, on a smaller scale, and illustrating one arrangement of cooling openings for circulating air through the rubber connecting member;

Figure 4 is a side elevational view of one of these connecting members, illustrating air circulating openings of modified form;

Figure 5 is a transverse sectional view through this modification taken on the plane of the line 5—5 of Figure 4;

Figure 6 is a view similar to Figure 4, illustrating another modified arrangement of the air circulating openings;

Figure 7 is an axial sectional view through this latter modification; and

Figure 8 is a transverse sectional view through the same, taken on the line 8—8 of Figure 7.

Figure 1:
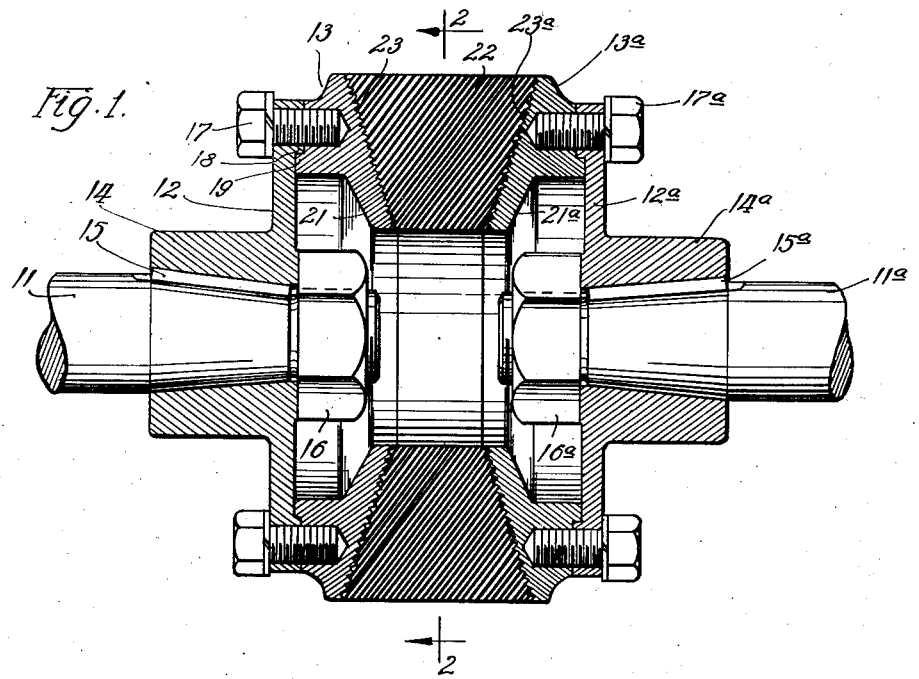
Figure 1 is a longitudinal sectional view through the universal joint.
Figure 2:
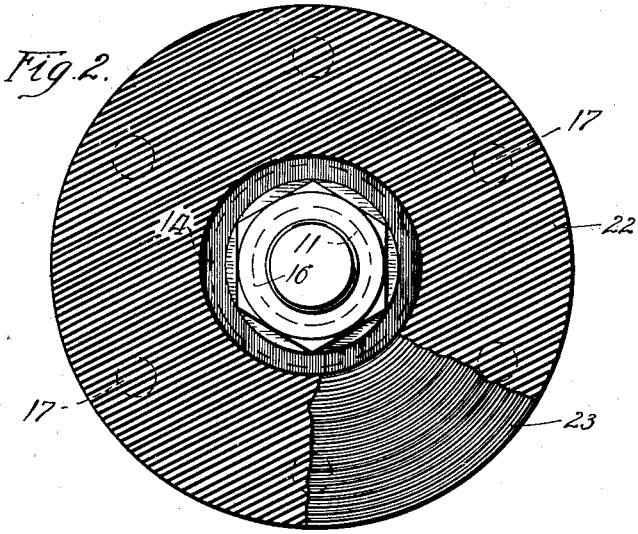
Figure 2 is a transverse sectional view, taken on the plane of the line 2—2 of Figure 1, a portion of the rubber connecting member being broken away to illustrate the grooved face of one of the coupling members.

Referring, first, to Figure 1, the two shafts 11 and 11$^a$ may be regarded as any rotary driving and driven elements of a power transmission train. For example, in automotive practice, one of these shafts may correspond with the propeller shaft of the vehicle and the other shaft may correspond with a driving or driven shaft extending from the transmission or differential housing. Mounted on these shafts are mounting devices comprising radially extending flanges 12, 12$^a$ and coupling rings 13, 13$^a$ secured thereto. The flanges 12 and 12$^a$ are formed integral with hubs 14, 14$^a$, which are non-rotatably secured on the shafts 11 and 11$^a$, respectively, as by the keys 15, 15$^a$. The shafts may be formed with reduced threaded ends for receiving nuts 16, 16$^a$ for drawing the hubs 14, 14$^a$ over the keys and over the tapered portions of the shafts in which the keys are seated.

The rings 13, 13$^a$ are secured to the radial flanges by cap screws 17, 17$^a$, which pass through apertures in the flanges and thread into openings in the rings. The flanges are formed with projecting internal shoulders 18, 18$^a$, which engage with projecting external shoulders 19, 19$^a$ on the rings, such shoulders relieving the cap screws of any radial stresses which may be set up in the joint. The opposing sides or ends of the two rings 13, 13ª are of conical cross-section, so that these opposing surfaces diverge outwardly from each other towards the outer peripheries of the rings on a rather sharp taper. The areas of these opposing surfaces are increased by forming inwardly extending flanges 21, 21ª on the rings 13, 13ª.

Interposed between the tapered surfaces of these rings is the rubber connecting member 22, which is preferably in the form of a ring having an outside diameter corresponding to the outer diameters of the two coupling rings 13, 13ª, and having an inside diameter corresponding to the inner diameters of the flange extensions 21, 21ª. Said rubber ring is of tapered cross-section with its tapered sides vulcanized directly to the tapered surfaces of the coupling rings 13, 13ª. In order to increase the area of vulcanized attachment between the rubber ring and the metallic coupling rings, the sloping surfaces of the latter are formed with alternating annular ridges and grooves, as indicated at 23, 23ª. The rubber is pressed into these serrated surfaces, and in being vulcanized thereto, is given a greater area of attachment, by virtue of the vulcanization to the side surfaces of the ridges and the bottoms of the grooves. Such construction also serves to interlock the rubber ring to the coupling rings against centrifugal force and other radial stresses.

The elastic ring may be composed solely of rubber or, if desired, some fabric may be embodied therein to give the ring greater stiffness. In the assembly of the universal joint, the rubber ring is first vulcanized to the surfaces 23, 23ª of the coupling rings 13, 13ª, these three elements thereby becoming a unit with the coupling rings 13, 13ª functioning as side metallic attaching portions for the rubber ring 22. This unit is then secured to one of the flanged mounting members 12, 12ª by the cap screws 17, 17ª, said mounting member having been previously secured to its respective shaft. Thereupon, the other shaft, with its flanged mounting member secured thereto, is moved into operative position and its radial flange is joined to the coupling unit by the cap screws 17 or 17ª.

In the operation of the universal joint, it will be evident that the inherent elasticity of the rubber ring will cushion motor impulses or other torque shocks transmitted in either direction through either shaft 11 or 11ª, the rubber ring undergoing torsional flexure at this time to permit a slight relative rotation between the two shafts in absorbing the torque shock or impulse. The radial elasticity of the rubber ring also enables the joint to adapt itself to conditions wherein the axes of the two shafts 11 and 11ª are parallel, but slightly out of alignment. When the universal joint is transmitting power through an angle with the axes of the two shafts inclined relatively to each other, as exemplified by a universal joint in the propeller shaft assembly of an automobile, the rubber ring is alternately subjected to compression at the inner side of the angle and to tension at the outer side thereof.

The tapered or wedge-shaped cross-section of the rubber ring is of particular advantage when the universal joint is operating under this latter condition. Considering first the inner side of the angle as defined by the axes of the shafts, it will be evident that the outer peripheries of the two coupling rings 13, 13ª are moved through a larger arc or path of convergence in approaching towards each other than are the inner peripheries of the flange extensions 21, 21ª, such naturally following from the fact that the outer peripheries are at a greater radial distance from the center of the universal joint. By virtue of the greater sectional thickness of the outer peripheral portion of the rubber ring, such larger degree of approaching movement between the outer peripheral portions of the coupling rings can be easily accommodated without the possibility of the rubber being injured in compression. Referring, now, to the outer side of the angle defined between the axes of the two shafts, it will be evident that, correspondingly, the outer peripheries of the two coupling rings 13, 13ª will be moved through a greater arc or path of separation than the inner peripheries of the flange extensions 21, 21ª. At this side of the angle, the rubber ring is subjected to tension, and by virtue of the greater sectional thickness of the outer peripheral portion thereof this portion can stretch to a greater degree without injury in accommodating the larger arc of separation between the outer peripheral portions of the coupling rings 13, 13ª. Thus, the tapered section of the rubber ring adapts the same to the different degrees of converging and separating movements between the coupling rings at different radial distances, whereby no part of the ring will be subjected to a greater compression or tension flexure which might tend to injure the same.

It will also be noted that the tapered slope of each coupling ring surface 23, 23ª increases the area of vulcanizing attachment between such surface and the rubber ring.

Provision may be made for circulating air through the rubber ring and thereby dissipating any heat which may be set up therein as a result of the rapid flexing of the ring, Figures 3 to 8, inclusive, illustrating different modifications of such construction. In Figure 3, the rubber ring is molded with cylindrical holes 25, extending from the inner to the outer peripheries of the ring at spaced points around the same. The webs of the radial mounting flanges 12 and 12ª are, in this construction, provided with a plurality of spaced air inlet openings 26, 26ª. Air enters into the circular space within the rubber ring through these inlet openings, and is thence whirled outwardly through the air circulating passages 25 under the centrifugal force of the rotating ring.

In Figures 4 and 5, the air circulating passages, designated 27, are of elliptical form, and taper outwardly from the inner to the outer periphery of the rubber ring, as best shown in Figure 5. Such passages afford a larger area of heat transfer surface for conducting the heat from the rubber to the air streams circulating through said passages.

In the construction of rubber ring illustrated in Figures 6, 7 and 8, the air circulating passages are grouped into two annular rows, with the passages in one row staggered or offset relatively to those in the other row.

These passages are also preferably of tapered, elliptical form, the passages in both rows being inclined inwardly to have their inner ends open into the center of the ring through the inner peripheral surface thereof, as shown in Figure 7.

In each of the constructions shown in Figures 3 to 8, inclusive, the air circulating passages have the additional utility of increasing the flexibility of the rubber ring, increasing its capacity for compression and expansion and its torsional elasticity. Thus, these passages or cavities may be provided in the ring for adapting the same to situations where the shafts are at a relatively sharp angle to each other, the elongated form of cavity illustrated in Figures 4 to 8, inclusive, being of particular advantage in this regard.

Having thus described my invention, what I claim as new and desire to secure by Letters Patent is:

1. In a universal joint, the combination of two coupling members mounted on driving and driven elements, a rubber ring interposed between said coupling members and secured thereto for resiliently transmitting torque between said rotary elements, and a plurality of passages in said ring extending from the inner to the outer peripheries thereof for circulating air through said ring and for increasing the transverse elasticity thereof.

2. In a universal joint, the combination of two coupling members mounted on driving and driven rotary elements, a rubber ring interposed between said coupling members and vulcanized thereto, and passages in said ring extending between the inner and outer peripheral portions thereof, said passages increasing in width in the plane of the ring toward the outer peripheral portion thereof.

3. In a universal joint, the combination with driving and driven rotary shafts, of mounting members thereon having outwardly extending flanges, coupling means between said flanges comprising a rubber ring through which the torque is transmitted, air circulating passages in said rubber ring extending between the inner and outer peripheral portions thereof, and air inlet vents in said flanges for admitting air to the inner peripheral portion of said ring.

In witness whereof, I hereunto subscribe my name this 25th day of October, 1928.

ALFRED O. WILLIAMS.